W. C. RIEHS.
LATHE ATTACHMENT.
APPLICATION FILED JAN. 13, 1910.
972,720.
Patented Oct. 11, 1910.
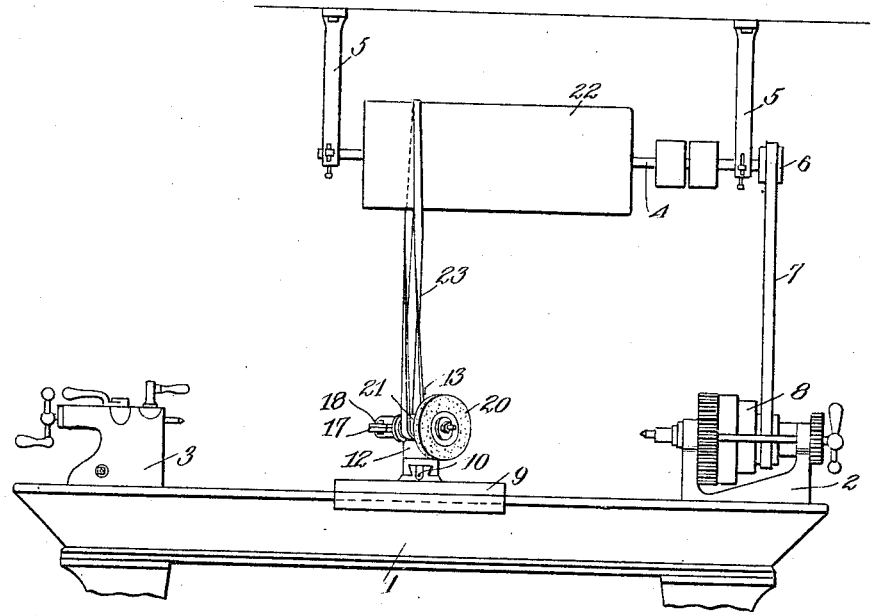
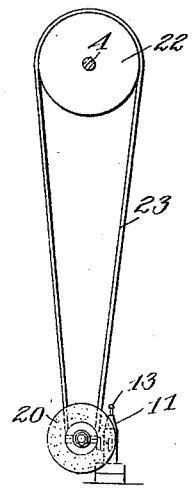
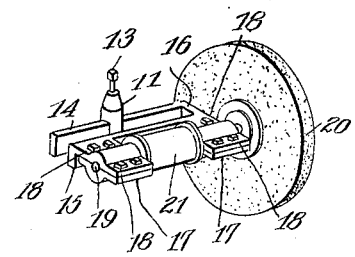
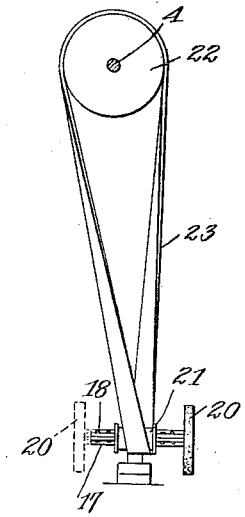
WITNESSES:
INVENTOR
William Charles Riehs
BY
ATTORNEYS

UNITED STATES PATENT OFFICE.

WILLIAM CHARLES RIEHS, OF SAN RAFAEL, CALIFORNIA.

LATHE ATTACHMENT.

972,720. Specification of Letters Patent. Patented Oct. 11, 1910.

Application filed January 13, 1910. Serial No. 537,802.

*To all whom it may concern:*

Be it known that I, WILLIAM CHARLES RIEHS, a citizen of the United States, and resident of San Rafael, in the county of Marin and State of California, have invented certain new and useful Improvements in Lathe Attachments, of which the following is a specification.

My invention is an improvement in lathe attachments, and consists in certain novel constructions and combinations of parts hereinafter described and claimed.

The object of the invention is to provide an emery wheel attachment for use with any lathe, which may be easily connected and disconnected, and which will be easily operated.

Referring to the drawings forming a part hereof, Figure 1 is a front view of a portion of a lathe provided with the attachment, Fig. 2 is a perspective view of the attachment, Fig. 3 is an end view of the operating shaft and the attachment, and Fig. 4 is a similar view showing the attachment in another position.

The embodiment of the invention is shown attached to a lathe of ordinary form, consisting of a bed 1, a head stock 2 and a tail stock 3, and is operated from a power shaft 4, journaled in overhead bracket bearings 5 and provided with a pulley 6, connected by a belt 7, with the cone or stepped pulley 8 of the head stock.

The tool rest of the lathe consists of a base 9 mounted to slide on the bed, and provided with a transverse rib 10 having undercut sides, and the holder consisting of a post 11, mounted on a plate 12 having a groove to receive the rib. The post is provided with a transverse slot, and with a set screw 13 threaded through the end of the post and extending into the slot.

The attachment proper consists of a frame or carriage composed of two parallel bars 14 and 15, connected at one end by a transverse bar 16, and the bar 15 is provided at each end with a sectional bearing box 17, extending laterally and on the opposite side from the bar 14.

The sections of the bearing boxes are secured together by bolts 18, and a shaft 19 is journaled in the bearings of the boxes. On one end of the shaft outside of the bearing boxes is secured an emery wheel 20, and intermediate the bearings the shaft is provided with a pulley 21.

A roller 22 is secured to the power shaft 4, and a belt 23 connects the roller with the pulley 21 of the attachment. The attachment is supported on the post 11, by passing the bar 14 through the slot, and by means of the set screw, the bar may be secured in position.

The attachment consists in its simplest form of a bar or support provided with spaced bearings, a shaft journaled in the bearings, and provided with an emery wheel, and a tongue connected with the support for engaging the tool holder of a lathe.

I claim:

1. An attachment of the character specified comprising a frame composed of spaced substantially parallel bars connected at one end, one of said bars having at each end a lateral sectional bearing box extending in the opposite direction from the other bar, a shaft journaled in the boxes, an emery wheel secured to one end of the shaft, a pulley secured to the shaft intermediate the boxes, a carriage slidable on the lathe bed, a post slidable transversely of the carriage and having a transverse slot for receiving the other bar of the carriage and a set screw threaded through the post and engaging the bar.

2. An attachment of the character specified comprising a frame composed of spaced substantially parallel bars connected at one end, one of said bars having at each end a lateral sectional bearing box extending in the opposite direction from the other bar, a shaft journaled in the boxes, an emery wheel secured to one end of the shaft, and a pulley secured to the shaft intermediate of the boxes.

3. An attachment of the character specified, comprising a carriage composed of spaced substantially parallel bars connected at one end, one of said bars having lateral spaced bearing boxes, a shaft journaled in the boxes, an emery wheel secured to the shaft, and a pulley secured to the shaft intermediate the boxes.

4. An attachment of the character specified, comprising a bar having at each end a bearing box, a shaft journaled in the boxes, an emery wheel on the shaft, and a bar connected to the first named bar and extending substantially parallel therewith for engaging the tool holder of a lathe.

WILLIAM CH. RIEHS.

Witnesses:
NEWELL VANDERBILT,
CLEMENT C. EDWARDS.